United States Patent [19]
Gerth et al.

[11] Patent Number: 4,949,255
[45] Date of Patent: Aug. 14, 1990

[54] MESSAGE INTERFACE AND METHOD FOR RECURSIVE CALLING BETWEEN INTERPRETIVE AND COMPILED COMPUTER PROCESSES

[75] Inventors: John A. Gerth, Danbury, Conn.; Michael T. Wheatley, San Jose, Calif.

[73] Assignee: International Business Machines Corp., Armonk, N.Y.

[21] Appl. No.: 241,415

[22] Filed: Sep. 7, 1988

[51] Int. Cl.⁵ .................................................. G06F 9/44
[52] U.S. Cl. ............................... 364/200; 364/280; 364/280.2; 364/284.3; 364/260.2
[58] Field of Search ... 364/200 MS File, 900 MS File, 364/300

[56] References Cited

U.S. PATENT DOCUMENTS

| | | | |
|---|---|---|---|
| 4,410,940 | 10/1983 | Carlson et al. | 364/200 |
| 4,530,051 | 7/1985 | Johnson et al. | 364/200 |
| 4,553,202 | 11/1985 | Trufyn | 364/200 |
| 4,587,628 | 5/1986 | Archer et al. | 364/900 |
| 4,703,416 | 10/1987 | Crupi et al. | 364/200 |
| 4,736,321 | 4/1988 | Brown et al. | 364/300 |

FOREIGN PATENT DOCUMENTS 58-90248  5/1983  Japan

*Primary Examiner*—Thomas C. Lee
*Attorney, Agent, or Firm*—Herb Somermeyer; R. Bruce Brodie

[57] ABSTRACT

APL, an interpretive processor, cooperates with external routines by calling those external routines to process data passed to them and receives results from the external routines. The called external routines, during their respective execution of the call, can request internal services of the calling APL interpretive processor. Such requests include execution of internal APL functions or operators, calling other external routines, recursive execution of external routines, and setting or obtaining values of internal APL data items.

3 Claims, 1 Drawing Sheet

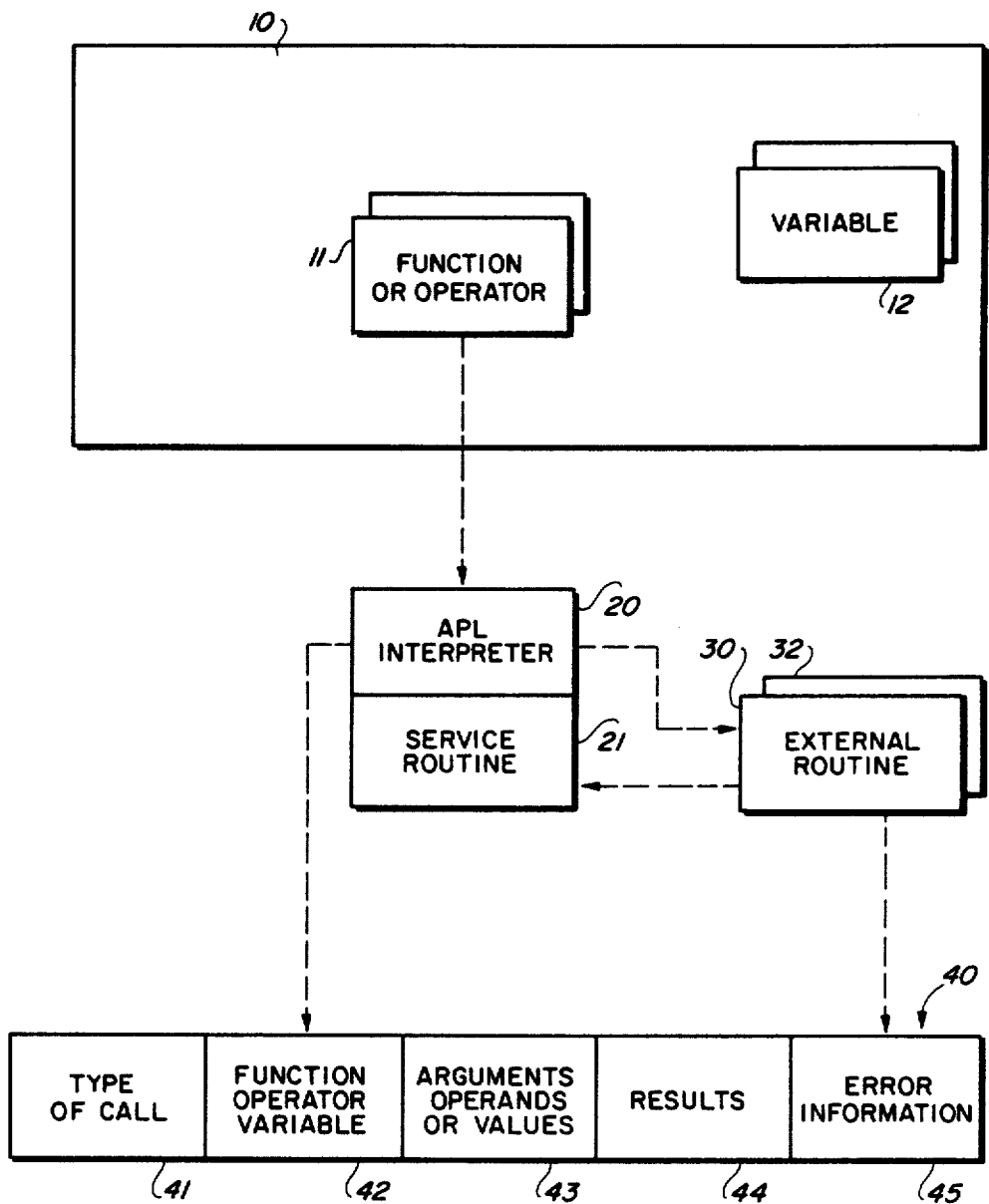

MESSAGE INTERFACE AND METHOD FOR RECURSIVE CALLING BETWEEN INTERPRETIVE AND COMPILED COMPUTER PROCESSES

DOCUMENT INCORPORATED BY REFERENCE

U.S. patent Brown et al 4,736,321 (hereafter '321) is incorporated herein.

1. Field of the Invention

The present invention relates to digital computing, more particularly to interaction between an interpretive processor, as provided by APL programs, with other processes, programs, herein collectively referred to as external routines.

2. Background of the Invention

APL (a programming language) is a well known and widely used interpretive language and processor. The APL processor typically executes in a data processing system having a keyboard input and a raster display output connected to a host processor. APL includes the facility to dynamically construct, modify and execute software as well as directly process entire data structures. APL's power derives from a general data structure, the array with the consequential ability to define powerful operators on the structures. There are several descriptions of APL and known APL program products: see Gilman and Rose, "APL: An Interactive Approach", 3rd Edition, John Wiley Publishing Co., 1984; Polivka and Pakin, "APL: The Language and Its Usage", Prentice Hall Publishing Co., 1975; Rodney Zaks, "A Microprogrammed APL Implementation", Sybex, Inc., 1978; and the IBM publication SH20-9227, entitled "APL2 Programming: Language Reference, available from International Business Machines Corporation (IBM). APL is implemented as an interpretive processor which provides interpretive execution of programs written in the APL language, as well as the ability to invoke routines written in other languages, termed "external routines" and to pass arguments to such external routines and retrieve results from the external routines. Interaction between an APL interpretive environment and an external routine utilizes a message passing interface, or protocol. One such known message interface is described in the IBM publication SH20-9234 entitled "APL2 Programming: Processor Interface Reference", available from International Business Machines Corporation, Armonk, NY.

It is desired to expand the capabilities of the interpretive processor and other processes invoked by it for enabling those processes to request services from the interpretive processor.

DISCUSSION OF PRIOR ART

The present invention is an improvement over the invention disclosed and claimed in U.S. Pat. No. 4,736,321. This patent shows a method for executing external processes and for accessing external data from within an interpretive language workspace. The workspace task referencing the external processes or data is synchronized and locked until the process is completed or the data referenced. The method steps provide establishing a message interface and utilize coercion of arguments in a dynamic environment. This arrangement permits invocation of a non-interpretive process from within an APL workspace and return of information from the external process without terminating the APL workspace. Such external process is herein termed "external routine". In particular patent '321 shows invoking a FORTRAN library routine wherein the library routine is resident in a library in the host processor or its peripheral data storage which is functionally and logically external to the APL session. In this invocation of computation by the external routine (external to APL workspace) the argument(s) are converted from APL to an external format and the externally generated result is converted from the external format to APL format.

Carlson et al in USP 4,410,940 show a method of transferring control between hierarchically related cooperating sequential processes executable in a multiprocessing environment. Pointers identify active and suspended processes. Activation records are generated and stored, then the process pointers are updated to record the suspension of one process and activation of another process by resuming program execution in the most recently executing portions of the another process. Each process has one activation record in internal data storage. The record points to the activation that is the parent of the process, to the most recently executing portion of the process and defines the current execution state of the process. No suggestion is made regarding parallel executing processes which exhibit independence while sharing data structures.

Trufyn in USP 4,553,202 teaches how a user actuates a real time resource reallocation in a multi-tasking environment. The operating system builds a queue against such resources and wherein a new task is interrupt invoked. Then a dispatcher allocates the resource to the next task in the resource queue with the queue switching being orthogonal to the process scheduling by the dispatcher.

SUMMARY OF THE INVENTION

It is an object of this invention to provide callback facilities in an interpretive processor for enabling external routines to call in an interpretive processor individual interpretive processes, or to set or obtain values of data items which exist in the interpretive environment. In connection with this object, recursive calls between the interpretive processor and external routines are enabled.

In accordance with the invention, an external routine, independently or after receiving a call from an interpretive processor which passes argument information to the external routine, activates the interpretive processor to perform interpretive functions on behalf of the external routine. Communication between the interpretive processor and the external routine is via a message passing interface which facilitates bilateral exchanges of control and information between the interpretive processor and the external routine(s).

An external routine, invoked as a synchronous subroutine by the interpretive processor, using the aforementioned message passing interface, sends requests to the interpretive processor by synchronously passing control to a service routine in the interpretive processor whose entry point address was previously provided to the external routine by the interpretive processor, such as by using the message passing interface. The message passing interfaces is used in specifying the nature of the request made to the interpretive processor's service routine, the identification of routines or data items in the interpretive environment for access by the external routine and pointers to arguments and/or values related to the request.

Using the present invention, an external routine can cause the interpretive processor to perform a variety of individual programmed operations, including executing routines which exist in the interpretive environment, recursively executing the external routine which itself issued the service request, and obtaining or setting the values of variables which exist in the interpretive environment.

The foregoing and other objects, features, and advantages of the invention will be apparent from the following more particular description of preferred embodiments of the invention, as illustrated in the accompanying drawings.

DESCRIPTION OF THE DRAWING

The FIG. diagrammatically illustrates an APL interpretive processor cooperating with one or more external routines.

DETAILED DESCRIPTION

The illustrated interpretive processor is preferably the APL2 program product 5668-899 of IBM, no limitation thereto intended. The illustration is simplified for more clearly pointing up the invention by avoiding undue repetition of details about APL2. Each APL user, as is well known, has an active workspace 10 which contains all APL objects collectively identified by numerals 11 and 12 necessary for completing APL program execution. Such objects include variables 12 which contain structured collections of data, functions 11 which are programs that manipulate and perform computations on the variables 12, and operators 11 which process functions and variables to create new functions for application to the variables. Each object is named when created. Such name is used by APL in accessing the created object.

It is well known that APL invokes functions and operators 11 within the active workspace 10 for performing user specified machine operations on data for producing results. Additionally, as taught in patent '321, APL also invokes external routines 30, written in languages other than APL, to perform processing upon arguments passed by APL to such external routines for generating results usable in the APL active workspace 10.

Combining the invocation of an external routine by APL, as taught in patent '321, with one aspect of the present invention enables the invoked external routine 30, or other external routine 32, to send a request to APL to execute a specified internal APL function or internal operator 11 and return the results to the calling external routine. APL can perform certain operations more efficiently than external routine 30, hence enhancing the total computational efficiency of the host processor. That is, with a sequence of calls out of APL interleaved with calls into APL, those computational activities most efficiently performed by non-APL routines are performed by such routines while those computational activities most efficiently performed by APL are performed by APL.

Combining the invocation of an external routine, as taught in 12 patent '321, to execute processing function on arguments passed to it and then provide the results to APL, another aspect of the invention enables the invoked external routine 30, or other external routine 32, to send a request to APL for obtaining or setting values of specified internal APL variables 12 in the active workspace 10. Through such requests, external routine 30, while it is executing, may dynamically obtain or set the values of APL variables 12. Such variables 12 include those APL variables which were or have not been passed as arguments to the executing external routine nor produced by the executing external routines as explicit results of the APL call to it. Such requests provide the executing external routine 30 access to specific data items which are internal to active workspace 10, such direct access to internal data is not enabled by the prior art. This additional capability enhances the effectiveness of such external routines resulting in efficiently providing more processing functions for the interpretive processor, hence the APL or other user.

When external routine 30 has been invoked by APL interpreter 20, such as described in patent '321, APL interpreter 20 invokes the external routine 30 as a subroutine. The interface enabling this invocation is now also well known for passing pointers 43 to argument data from APL to the external routine 30. See patent '321. Patent '321 also shows the external routine operating on the passed argument(s) and supplying results to APL, such as in result field 44 of the illustrated control block.

The present invention extends the control exchange and message passing capabilities between APL interpreter 20 and external routine 30 by providing to external routine 30 the current APL internal address of the APL service routine 21, a known part of interpreter 20. Now, external routine 30 can directly invoke service routine 21, in a call back, preferably when executing in response to the APL invocation that passed the service routine 21 current APL internal entry address. The call back requests to APL interpreter 20 include the purposes of requesting execution of specified function or operators 11 within active workspace 10 or for obtaining or setting values of specified APL variables, operands, etc. 12, all within active workspace 10.

A further extension of capability by the present invention allows the external routine 30 to specify the name of a variable 12 in field 42 of control block 40 which is available both to external routine 30 and APL interpreter 20, as indicated by the dashed lines extending between elements 20, 30 and 40. This specification enables external routine 30 to invoke service routine 21 to set or obtain the value of the named variable. When obtained, the value of the variable is stored in field 44 by service routine 21 making it readily available to external routine 30. External routine 30 can insert a pointer to an argument, operand or value in field 43 which was set of the external routine or returned by APL interpreter 20. The pointer 42 can be to the external routine 30, itself, or to other external routines. Such an operation enables the external routine 30 to use the pointer on ensuing call backs to request recursive executions of itself. Further, external routine 30 can specify the type of call back request in field 41 when control is passed to the service routine 21. Such types of call backs include executing a function or operator, obtaining the value of a variable or setting the value of a variable.

The figure shows external routines 30, 32 as well as APL interpreter 20 and service routine 21 accessing a control block 40. Control block 40 includes field 41 indicating the type of call from or to external routine 30, field 42 for containing a pointer to the name of the function, operator or variable to be accessed by the external routine, pointers to the APL internal arguments, operands or values in field 43, pointers to the computational results as stored in field 44 by APL service routine 21 and error information in field 45. The addressability of internal APL objects is now extended to external routines enabling such external routines to access individual ones of the internal APL objects for effecting specific APL responses in a call back mode.

In a constructed embodiment, APL interpreter 20 first inserted appropriate information in control block 40 for later use by external routine 30 which is to be called as set forth in patent '321. Thereafter, external routine 30 accesses control block 40 for inserting/reading information, as required. Then external routine 30 calls the service routine 21 for performing requested operations, such as set forth above. Thereafter, service routine stores information into the control block 40 for accessing by external routine 30.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method, in a multiprocessing environment having an interpretive processor which includes a service routine and a plurality of internal named objects, of accessing individual internal ones of said named objects by a non-interpretive external routine, including the machine-executed steps of:
    establishing a message passing interface between said external routine and said processor which includes a pointer to an entry point of said service routine for enabling passing control in the environment from the external routine directly to said service routine;

invoking said external routine from said processor and while the external routine is executing by said invocation enabling recursive calling of the external routine by itself via said message passing interface;

invoking said service routine from said external routine, and while the service routine is invoked, indicating in the message passing interface a type of interpretive service is to be performed, identification of a processing routine in the processor to be executed and pointers to or other identification of argument data as an input to he identified processing routine, or identification of individual data items to be accessed within the processor by the external routine;

synchronously passing control of the environment from the external routine to the processor at the entry point of the service routine for enabling execution of the identified processing routine by said service routine; and when returning control of the environment from the service routine to the external routine, indicating in the established message passing interface pointers to results produced for enabling access to such results by said external routine.

2. In the machine-effected method set forth in claim 1, further including the machine-executed steps of:
    upon completing the identified processing routine requested by the external routine which includes production of computational results, retrieving results into the external routine; and
    continue executing the external routine under said invocation by the processor.

3. In the machine-effected method set forth in claim 2, further including the machine-executed steps of:
    using said results in other predetermined machine operations in either said interpretive processor or said external routine.

* * * * *